March 18, 1952 W. A. RAY 2,589,573
ELECTROMAGNETIC RESET VALVE
Original Filed June 3, 1943 2 SHEETS—SHEET 1

Inventor:
William A. Ray
By John Flam
Attorney.

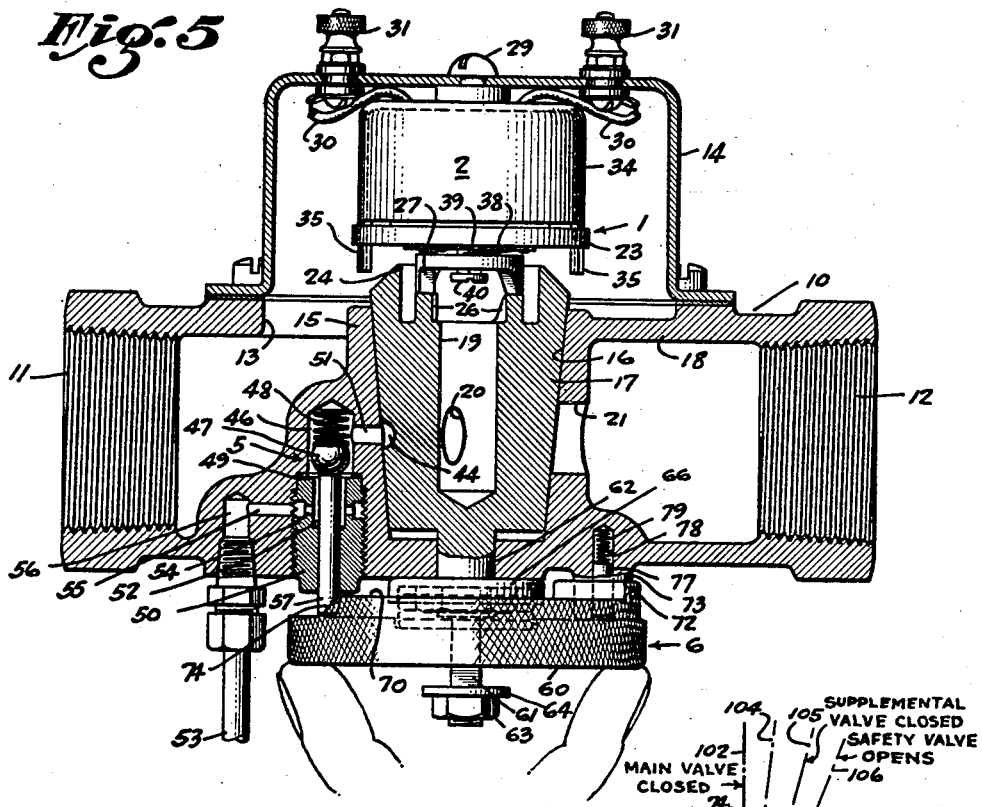

Patented Mar. 18, 1952

2,589,573

UNITED STATES PATENT OFFICE 2,589,573

ELECTROMAGNETIC RESET VALVE

William A. Ray, North Hollywood, Calif., assignor to General Controls Co., Glendale, Calif., a corporation of California Original application June 5, 1943, Serial No. 489,801, now Patent No. 2,422,368, dated June 17, 1947. Divided and this application August 20, 1946, Serial No. 691,835

16 Claims. (Cl. 137—139)

This invention relates to a reset valve for fluid fuels. This application is a division of an application filed in the name of William A. Ray on June 5, 1943, under Serial No. 489,801, now patent No. 2,422,368, June 17, 1947 and entitled "Electromagnetic Reset Valve."

Such reset valves are used in fuel supply systems to ensure against flow of fuel to the burner unless a pilot flame is lit. A valve of this character is usually arranged to be maintained open by an electromagnet energized by a thermocouple, or a thermopile in the pilot flame. Then the main cock may be turned on and off, as desired, the pilot flame serving to ignite the fuel passing through the main burner whenever the cock is opened.

If the pilot flame should be extinguished, the safety valve closes. To re-establish the fuel supply, the safety valve may be manually reset to open position and held in the open position until the pilot flame is ignited. If the flame for any reason fails to ignite, release of the reset valve causes the valve to close again; and a resetting operation must be again attempted.

A safety valve of this general character is described in an application filed in the name of William A. Ray, on February 4, 1941, Serial No. 377,274, now patent No. 2,403,611, July 9, 1946, entitled "Reset Valve and Control Therefor."

It is an object of this invention to provide such a valve of compact and simplified construction and having an improved mode of operation.

It is another object of this invention to make it possible to control the passage of fuel to the pilot burner during the resetting operation, in a convenient and simple manner.

It is another object of this invention to provide a reset valve including a main valve, and a supplemental valve for independently controlling a pilot burner, and having a single actuator which is optionally operable for operating the main valve or the supplemental valve.

It is a still further object of this invention to provide a reset valve including a main valve and a safety valve, and so arranged that operation of the main valve acts directly to actuate the safety valve.

It is a still further object of this invention to provide a reset valve arranged to give an indication when the main or manually operable valve is closed.

This invention possesses many other advantages, and has other objects which may be made more easily apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

In the drawings:

Figure 1 is a longitudinal section through a valve incorporating the invention;

Figs. 2, 3, and 4 are sections as seen on correspondingly numbered planes of Fig. 1;

Fig. 5 is a view similar to Fig. 1, but showing the valve in a different operating position.

Fig. 6 is a fragmentary section as seen on plane 6—6 of Fig. 1; and

Fig. 7 is a diagram indicating the various operating positions of the main valve closure.

Figure 1:
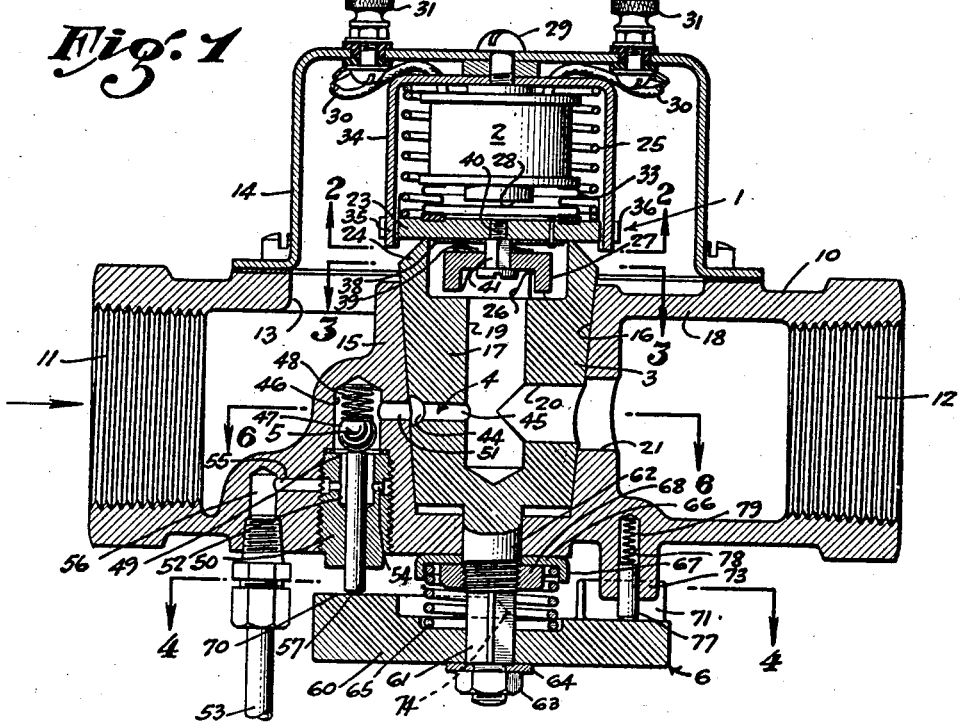
Figure 2:
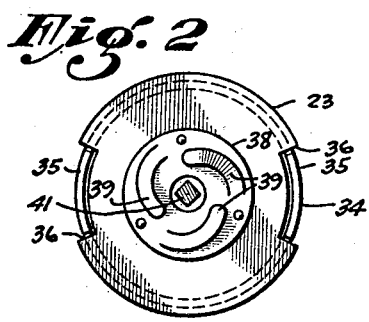

This valve is of the type for controlling the fluid fuel supply to a burner which is intermittently operated, a constantly lighted pilot burner being provided for igniting the main burner after periods of inactivity.

The valve structure comprises a main valve 3 which is manually operable for optionally controlling the supply of fuel to a main burner (not shown). Obviously it is important to provide means whereby, upon extinguishment of the main burner and of the pilot burner, the supply of fuel to these burners is interrupted. Further, means must be provided for preventing re-establishment of the supply to the main burner until the pilot burner has been relighted. For this purpose, a safety valve 1 is provided controlling the passage of fuel through the valve and adapted to be retained in open position by an electromagnet 2 energized in response to electricity generated by the heat of the pilot burner flame in a well known manner, as by a thermocouple (not shown). Upon the extinguishment of the pilot burner for any reason, coil 2 is de-energized, permitting valve 1 to close, and stopping all fuel supply to the burners. To avoid a dangerous condition when the valve 1 is opened, the means for opening valve 1 are so arranged that main valve 3 must be closed before the valve 1 can be opened. Further, before valve 3 can be opened, without permitting valve 1 to close, the pilot burner must be lighted to energize magnet 2 to retain valve 1 in open position. To permit a fuel supply to the pilot burner when valve 1 is open and before valve 3 is opened, a by-pass 4 is provided in valve 3. To facilitate proper lighting of the pilot burner and to make it possible to prevent supply of fuel to the pilot burner until the operator is ready, a supplemental valve 5 is provided in by-pass 4, which is automatically closed when the main valve 3 closes, but which may be opened before valve 3 is opened. However, means are provided so that, when the main valve 3 is open, supplemental valve 5 is maintained open. A common actuating means 6 is provided for valves 3 and 5, being arranged for movement in one plane to open and close valve 3 and for movement in a direction out of this plane to open valve 5.

The valve structure comprises an elongated body 10 having axially aligned threaded openings 11 and 12 at its opposite ends for connection to suitable conduits and forming, respectively, the inlet and outlet. Between the inlet and outlet openings 11 and 12 is a transverse opening 13, closed by a detachable cover 14. There is also a boss 15 extending transversely of body 10 and forming a seat 16 for a tapered rotary plug 17, and a web wall 18, the boss 15, plug 17, and wall 18 serving to interrupt communication between the inlet 11 and outlet 12. To establish communication between the inlet and the outlet, plug 17 has an axial port 19 adapted to connect with inlet 11 and intersected by a radial port 20 adapted to connect with outlet 12 through port 21 in the boss 13. Rotation of plug 15 in seat 14 serves to place ports 20 and 21 into or out of registry as desired.

Safety valve 1 includes a valve member 23 in the form of a disc of magnetic material adapted to co-operate with a valve seat 24 formed on the end of valve plug 17. A light compression spring 25 urges disc 23 to seat 24. When member 23 is on seat 24, communication between inlet 11 and port 19 is interrupted; hence, no fluid can pass from inlet 11 to outlet 12 regardless of the registry of ports 20 and 21. A cam surface comprising a pair of cams 26 is formed on the upper end of plug 17, and means forming a co-operating cam surface 27 is secured to valve disc 23, so that rotation of plug 17 serves to raise disc 23 from seat 24 against the force of spring 25 and into contact with the face 28 of the electromagnet 2 mounted in cover 14. This magnet 2, upon appropriate energization, retains valve disc 23 in open position. Electromagnet 2 is supported within cap 14 by a single screw 29, and is provided wih leads 30 and binding posts 31 for connection with a suitable source of electric current, such as a thermocouple.

Since the fluid passing through the valve carries a certain amount of sticky material, dirt, etc., likely to be deposited within the valve, and, particularly since the force exerted by magnet 2 is small, it is desirable to protect face 28 of the magnet, as well as the co-operating face of disc 23, from the fluid. Otherwise, a deposit of such material on these faces would seriously reduce the holding power of the magnet 2, or possibly cause the disc to stick in open position. For this purpose a short metallic bellows or Sylphon 33, surrounding face 28, is secured to the lower surface of electromagnet 2 and to disc 23.

It is, of course, necessary to prevent disc 23 and cam means 27 from rotating in order that rotation of plug 17 and cam means 26 will be effective to raise disc 23. For this purpose an inverted cup 34 is secured within cap 14, as by being clamped between the upper end of magnet 2 and the under surface of cap 14, serving to enclose magnet 2 and spring 25. Cup 34 has its lower edge serrated to provide teeth 35, which engage arcuate slots 36 formed on the periphery of disc 23.

The energization of electromagnet 2 by the thermocouple is purposely such that the magnet is incapable of attracting disc 23 from its dropped position.

It is, accordingly, desirable that appropriate rotation of plug 17 will cause the cams 26 and 27 to bring valve disc 23 directly into contact with face 28. To allow for manufacturing tolerances, as well as to guard against urging disc 23 against face 28 with such force as to damage the parts, a member 38, having a plurality of resilient fingers 39, is interposed between cam means 27 and disc 23. As clearly shown in Fig. 1, cam means 27 is secured to disc 23 by a screw 40 having a flat sided portion 41, the cam means 27 being axially slidable on portion 41 and urged downwardly therealong by spring fingers 39. Thus, when cam means 27 is moved upwardly, as by cam means 26, this upward movement is imparted to disc 23 through fingers 39; and, upon disc 23 contacting face 28, further upward movement of cam means 27 merely flexes fingers 39.

The by-pass port 4 for supplying the pilot burner comprises a circumferential groove 44 on plug 17, extending partly around the periphery thereof, and communicating with port 19 through a radial port 45. The boss 15 of body 10 has an extension forming a chamber 46 for accommodating the supplemental valve 5 which may comprise a ball 47 urged as by spring 48 toward a seat 49, formed on a plug 50 threaded into the lower end of chamber 46. That portion of chamber 46 above seat 49 is open to groove 44 and hence to ports 45 and 19 through port 51, while that portion of chamber 46 below seat 48 comprising bore 52 of plug 50 communicates with tube 53 which leads to the pilot burner (not shown) via ports 54, 55, and 56. Seating of ball 45 interrupts communication between the interior of plug 17 and tube 53. A push rod 57 extends through plug 50, upward movement of rod 57 serving to unseat ball 47 against the force of spring 48.

Figure 4:
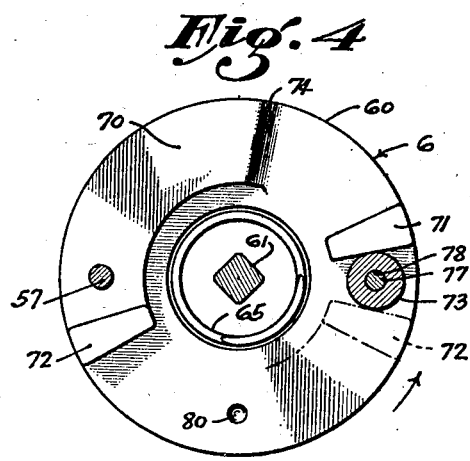

The actuating means 6 for operating the valves will now be described, attention being directed to Figs. 1, 4, and 5. A circular disc or actuator 60, with a knurled periphery adapted to be conveniently gripped by the fingers, is slidably mounted on the flat sided portion 61 of a downward extension 62 of plug 17, being retained thereon by a nut and washer 63 and 64. A compression spring 65 urges disc 60 downwardly against washer 64, the upper end of spring 65 seating against a washer 66 having an upturned retaining edge 67. To prevent any upward movement of plug 17 and consequent unseating thereof with respect to seat 16, incident to manipulation of actuator 60, a retaining nut 68 is threaded on stem 62 and maintains washer 66 in contact with the lower surface of body 10.

Appropriate rotation of the knob or actuator 60 will rotate plug 17 to place ports 20 and 21 into or out of registry, as well as to cause cam 26 to unseat valve disc 23. Further, actuator 60 has a raised portion or holding surface 70 which engages push rod 57, maintaining supplemental valve 5 open, this surface 70 having a sloping portion 74 which acts as a cam on rod 57 to cause valve 5 to open or close in response to rotation of the actuator 60.

The angular relationships existing between the cams and ports is best described in connection with the mode of operation of the valve. In this connection attention is called to Figs. 4 and 7, the latter being a diagrammatic showing of plug 17 and actuator 60. In both Figs. 4 and 7, the parts are shown as in the positions they occupy when the main valve 3 is fully open, as in Fig. 1. In Fig. 1 the safety valve 1 is shown as closed, as after accidental extinguishment of the pilot burner, or upon initiating operation of the burner; hence no fuel can flow to either the pilot burner or the main burner.

Figure 3:
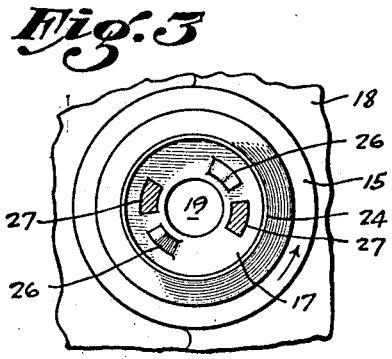

In a reset valve of this character, the closing of the main or manually operable valve 3 serves to open the automatic or safety valve 1. Since the main valve 3 must be fully closed before the safety valve 1 commences to open, the operating connection between the valves must include a lost motion provision. In the present instance, this lost motion is provided by suitable angular spacing between the co-operating cam surfaces 26 and 27, as illustrated in Fig. 3.

Stop means are provided for appropriately limiting angular movement of actuator 60; this may comprise lugs 71 and 72 on the actuator 60 for engaging respectively with a boss 73 on body 10. In the fully open position of Figs. 1, 4, and 7, lug 71 contacts boss 73. Movement of actuator 60 and plug 17 counterclockwise from this position will cause ports 20 and 21 to pass successively out of registry and then to close until, after 90° of movement, the main valve 3 may be regarded as effectively closed. This is indicated in Fig. 7 by lines 100, 101, and 102, which may be considered as successively reaching dart 103 in response to counterclockwise movement of actuator 60 and plug 17. After the amount of movement represented by the angle between dart 103 and line 102, cam surfaces 26 and 27 are still out of contact, hence valve 1 is still closed; further, the supplemental valve 5 is still open, due to rod 57 still being on holding surface 70. However, a small additional counterclockwise movement will bring the edge of cam surface 74 under push rod 57, allowing valve 5 to begin to close, further movement causing valve 5 to close completely. This can be visualized in Fig. 7 as the successive arrival of lines 104 and 105 at dart 103. All valves are now closed. Further counterclockwise movement of plug 17 brings cam surfaces 26 on the plug into engagement with the co-operating surfaces 27 on the valve disc 23 of safety valve 1, additional counterclockwise movement of plug 17 causing valve 1 to be fully opened and brought into contact with face 28 of magnet 2, and can be visualized by the successive arrival of lines 106 and 107 at dart 103.

It is now necessary to cause magnet 2 to be energized, as otherwise, upon returning plug 17 to open position, valve member 23 will immediately return to its seat 24 and prevent any fluid passing to valve 3. For this purpose, the pilot burner must be ignited and kept burning for a brief period until the thermocouple heated thereby generates sufficient current to energize magnet 2. Supplemental valve 5 must therefore be opened. This is accomplished by pressing actuator 60 toward body 10 and against the force of spring 65, causing push rod 57 to lift ball 47 from its seat 49. After an interval sufficient to allow the thermocouple to become active, actuator 60 is returned clockwise at least far enough to bring the end of rod 57 onto the holding surface 70 while still elevated; and then the actuator is brought to its original position with lug 71 engaging boss 73 and ports 20 and 21 is registry. Ample space is provided in chamber 46 about ball 47 to accommodate the ball 47 when actuator 60 is urged upwardly and push rod 57 is on the holding surface 70. Hence, it is not material when the actuator 60 is allowed to return to its lower position in response to spring 65, so long as it is maintained elevated long enough to ensure that valve 1 is held open.

It is to be noted that the provision of valve 5 for controlling the fuel supply to the pilot burner has important advantages. Thus, no fuel flows to the pilot burner until the operator is ready to ignite it, and all possibility of an accumulation of unignited fuel is avoided. Further, this valve is opened by a short easy movement distinct from that necessary to open the main valve.

In addition to the safety features of the valve, it is intended for use as a control. Thus, by turning the plug counterclockwise from the position of Figs. 1, 4, and 7, the flow of fuel to the main burner may be restricted or stopped entirely, that is, from the position indicated by line 102 to that indicated by line 103 of Fig. 7. Conversely, by turning the plug clockwise from the closed position, the flow of fuel may be initiated and regulated to any desired proportion of a full flow. For this purpose, it is, of course, essential that the pilot burner not be extinguished accidentally. Referring to Fig. 7, it will be noted that the angular movement of the actuator 60 necessary to close the valve 5 which controls fuel to the pilot burner is substantially greater than that required to close the main valve 3. Accordingly, such normal operation is easily accomplished; however, to facilitate it, means are provided for exerting a momentary restraint, as well as giving audible warning when the plug 17 reaches a fully closed position and before the pilot valve 5 closes.

For this purpose a detent 77 is slidably mounted in a bore 78 in boss 73, being continually urged against the actuator 60 by a spring 79. A depression 80 is provided in the surface of actuator 60 for receiving the detent 77, and is so positioned angularly with respect thereto as to be engaged by detent 77 when plug 17 is in closed position, and when the plug is being turned from open position before holding surface 70 has moved from under push rod 57 and allowed valve 5 to close. It will be apparent, when detent 77 is in engagement with depression 80, a restraint will be placed on the movement of actuator 60, requiring additional force to overcome it and move the actuator farther to pilot extinguishing position. Further, an audible click will result when the detent 77 drops into depression 80. Accordingly, accidental movement of the actuator 60 past closing position for main valve 3, with resulting inconvenience due to extinguishing the pilot, will be avoided. The actuator may be readily turned beyond this position when necessary until stop 72 engages boss 73 and the safety valve 1 is opened.

The inventor claims:

1. In a valve structure for fluid fuels: means forming a passageway for fuel; a valve seat, and a closure co-operable therewith for controlling fuel flow through said passageway; means for moving said closure to or from seating relationship with respect to said valve seat; an electromagnet adapted to maintain said closure in open position when energized, and when deenergized to release said closure for movement to closed position; said magnet and said closure having respective faces which are adapted to contact and complete the magnetic circuit through said magnet when said closure is in open position; and means, comprising an annular flexible wall connected between said magnet and said closure, forming a chamber enclosing said faces and isolating them from fuel in said passageway.

2. In a valve structure for fluid fuels: means forming a passageway for fuel, a valve seat, and a co-operating closure movable toward and away from said seat for controlling flow of fuel through said passageway, and continually urged toward closed position, means for moving said closure to open position, an electromagnet adapted to maintain said closure in open position, when energized, and when deenergized releasing said closure for movement to closed position, said magnet and said closure having respective faces which are adapted to contact each other to complete the magnetic circuit through said magnet when said closure is in open position, and a flexible wall co-operating with said magnet and said closure to form a chamber enclosing said faces and isolating them from fuel passing through the valve structure.

3. In a valve structure for fluid fuels: a main valve structure including a rotary plug for controlling fuel flow to a main burner; a supplemental valve including a closure for controlling fuel flow to a pilot burner; movable means operating upon said closure to move said closure to supplemental valve opening position; an actuator connected to said plug for operating the plug as well as for operating said movable means; said actuator including a holding portion engageable with said movable means for maintaining said supplemental valve in open position during movement of the actuator to cause the plug to open and to close said main valve, said holding portion terminating at a point so located as to cause said closure to close upon movement of said actuator past plug closing position; and means indicating arrival of the actuator at plug closing position.

4. In a valve structure for fluid fuels: a main valve structure including a rotary plug for controlling passage of fuel to a main burner; a supplemental valve for controlling passage of fuel to a pilot burner; means movable in one direction for operation upon said supplemental valve to move said supplemental valve to open position, and movable in the opposite direction to permit said supplemental valve to close; an actuator connected to said plug for operating the plug as well as for operating said movable means; means whereby movement of said actuator past plug closing position causes said movable means to move in said opposite direction to close said supplemental valve; and means indicating arrival of the actuator at plug closing position.

5. In a valve structure for fluid fuels: a main valve structure including a rotary plug for controlling passage of fuel to a main burner; a supplemental valve for controlling passage of fuel to a pilot burner; means movable in one direction for operation upon said supplemental valve to move said supplemental valve to open position, and movable in the opposite direction to permit said supplemental valve to close; an actuator connected to said plug for operating the plug as well as for operating said movable means; means whereby movement of said actuator past plug closing position causes said movable means to move in said opposite direction to close said supplemental valve; and means carried respectively by the body and the actuator co-operating to indicate arrival of the actuator at main valve closing position, said means including a spring pressed detent.

6. In a valve structure for fluid fuels: a main valve structure including a rotary plug for controlling fuel flow to a main burner; a supplemental valve for controlling fuel flow to a pilot burner; movable means operating upon said supplemental valve to move said supplemental valve to open position; means biasing said supplemental valve to closed position; an actuator connected to said plug for operating the plug, and movable axially thereof for moving said movable means to open the supplemental valve, said actuator having a holding surface engaging said movable means for maintaining the supplemental valve open during movement of the actuator to operate the plug between main valve open and closed positions; and a depressed surface for permitting the movable means to move from supplemental valve closing position upon movement of the actuator to operate the plug past main valve closing position; and means imposing resistance to movement of said actuator past plug closing position.

7. In a valve structure for fluid fuels: a main valve structure including a rotary plug for controlling fuel flow to a main burner; a supplemental valve having a seat and a closure cooperating with said seat for controlling fuel flow to a pilot burner; movable means operating upon said closure to move said closure away from said seat; an actuator connected to the plug for operating the main valve, and movable axially thereof for engaging said movable means for moving said closure away from said seat when the actuator is operated past main valve closing position, said actuator having a holding portion of limited angular extent engaging said movable member for maintaining said closure in supplemental valve opening position during movement of the actuator between plug opening and plug closing position, independently of axial movement of the actuator.

8. In a valve structure for fluid fuels: a main valve structure including a rotary plug for controlling fuel flow to a main burner; a supplemental valve spaced radially from the plug and including a seat and a closure cooperable therewith for controlling fuel flow to a pilot burner; a longitudinally movable member extending substantially parallel to the axis of said plug and having one end engageable with said closure to move said closure away from said seat; and an actuator connected to said plug for operating the plug, and movable axially thereof for engaging the other end of said longitudinally movable member for operating said closure to cause said supplemental valve to pass fuel to the pilot burner.

9. In a valve structure for fluid fuels: means forming a passageway for fuel; a valve seat, and a cooperating closure movable toward and away from said seat for controlling fuel flow through said passageway; an electromagnet adapted to maintain said closure in open position when energized, and when deenergized to release said closure for movement to closed position; said magnet and said closure having respective faces which are adapted to contact and complete the magnetic circuit through said magnet when said closure is in open position; and means, comprising an annular flexible wall connected between said magnet and said closure, forming a chamber enclosing said faces and isolating them from fuel in said passageway.

10. In a valve structure for fluid fuels: means forming a passageway for fuel, a valve seat, and a cooperating closure movable toward and away from said seat for controlling flow of fuel through said passageway, spring means continually urging said closure toward closed position, an electromagnet adapted to maintain said closure in open position, when energized, and when deenergized releasing said closure for movement to closed position, said magnet and said closure having respective faces which are adapted to contact each other to complete the magnetic circuit through said magnet when said closure is in open position, and a flexible wall cooperating with said magnet and said closure to form a chamber enclosing said faces and isolating them from fuel passing through the valve structure.

11. In a valve structure for fluid fuels: a main valve structure including a rotary plug for controlling fuel flow to a main burner; a supplemental valve including a seat and a closure cooperating with said seat for controlling fuel flow to a pilot burner; movable means operating upon said closure to move said closure to supplemental valve opening position; an actuator connected to said plug for operating the plug, as well as said movable means, said actuator including a holding portion engageable with said movable means for maintaining said closure in supplemental valve opening position during movement of the actuator to cause the plug to open and to close said main valve, said holding portion terminating at a point so located as to cause said movable means to close said supplemental valve upon movement of said actuator past main valve closing position; and means imposing resistance to movement of said plug past plug closing position.

12. In a valve structure for fluid fuels: a main valve structure including a rotary plug for controlling passage of fuel to a main burner; a supplemental valve for controlling passage of fuel to a pilot burner; movable means operating upon said supplemental valve to move said supplemental valve to open position; an actuator connected to said plug for operating the plug as well as the movable means; means whereby movement of said actuator past plug closing position causes the movable means to close said supplemental valve; and means imposing resistance to movement of said plug past plug closing position.

13. In combination: a valve structure including a valve closure for controlling flow of fluid through the structure; an electromagnet for maintaining said closure in attracted position for opening said valve structure when the electromagnet is energized, and releasing said closure for movement from attracted position when de-energized; and means for urging said closure toward attracted position, comprising a pair of cooperating cam members, one of said members being resiliently carried by said closure for limited movement with respect thereto in the direction of movement of said closure.

14. In combination: a valve structure including a valve closure for controlling flow of fluid through the structure; an electromagnet for maintaining said closure in attracted position for opening said valve structure when the electromagnet is energized, and releasing said closure for movement from attracted position when de-energized; means for urging said closure toward attracted position, comprising a pair of cooperating cam members; and means resiliently mounting one of said members for limited movement in the direction of movement of said closure.

15. In combination: a valve closure for controlling flow of fluid through a valve body; an electromagnet for maintaining said closure in attracted position when energized, and releasing said closure for movement from attracted position when de-energized; said electromagnet and said closure respectively having faces adapted to contact each other to complete the magnetic circuit through said magnet when said closure is in attracted position; and means for moving said closure toward attracted position, comprising a pair of cooperating cam members and means acting on one of said cam members creating a resilient force urging said closure toward attracted position.

16. In combination: a valve closure for controlling flow of fluid through a valve body; an electromagnet for maintaining said closure in attracted position when energized, and releasing said closure for movement from attracted position when de-energized; said electromagnet and said closure having opposed faces adapted to contact each other to complete the magnetic circuit through said magnet when said closure is in attracted position; a cam operator for moving said closure toward attracted position; a cam follower member carried by said closure; means mounting said cam follower member for limited movement with respect to said closure in the direction of movement of said closure; and resilient means interposed between said cam follower member and said closure.

WILLIAM A. RAY.

REFERENCES CITED

The following references are of record in the file of this patent:

UNITED STATES PATENTS

| Number | Name | Date |
|---|---|---|
| 255,914 | Bergen | Apr. 4, 1882 |
| 1,252,312 | Warren | June 1, 1918 |
| 1,926,790 | Ploen | Sept. 12, 1933 |
| 1,993,891 | Light | Mar. 12, 1935 |
| 2,188,836 | Goodwin | Jan. 30, 1940 |
| 2,230,771 | Wiltshire | Feb. 4, 1941 |
| 2,288,417 | Paille | June 30, 1942 |
| 2,297,718 | Ray | Oct. 6, 1942 |
| 2,299,654 | Ray | Oct. 20, 1942 |
| 2,388,696 | Lacart | Nov. 13, 1945 |
| 2,400,861 | Wolcott | May 21, 1946 |
| 2,402,732 | Cohen | June 25, 1946 |
| 2,422,368 | Ray | June 17, 1947 |